United States Patent [19]
Lee

[11] Patent Number: 5,386,210
[45] Date of Patent: Jan. 31, 1995

[54] METHOD AND APPARATUS FOR DETECTING ENTRY

[75] Inventor: Wade Lee, Alamo, Calif.

[73] Assignee: Intelectron Products Company, Hayward, Calif.

[21] Appl. No.: 93,978

[22] Filed: Jul. 19, 1993

Related U.S. Application Data

[63] Continuation of Ser. No. 750,868, Aug. 28, 1991, abandoned.

[51] Int. Cl.$^6$ ............................................. G08B 13/18
[52] U.S. Cl. ................................. 340/567; 250/342; 340/522
[58] Field of Search ................................. 340/565–567, 340/539, 600, 309.15, 522; 341/176; 362/802; 250/214 AL, 342, 338.1; 315/149, 155; 361/173

[56] References Cited

U.S. PATENT DOCUMENTS

| | | | |
|---|---|---|---|
| 4,703,171 | 10/1987 | Kahl et al. | 340/567 X |
| 4,890,093 | 12/1989 | Allison et al. | 340/567 |
| 4,975,584 | 12/1990 | Benjamin et al. | 340/600 X |
| 5,015,994 | 5/1991 | Hoberman et al. | 340/567 |
| 5,142,199 | 8/1992 | Elwell | 340/567 X |
| 5,189,393 | 2/1993 | Hu | 340/522 |

FOREIGN PATENT DOCUMENTS

| | | |
|---|---|---|
| 9105106 | 6/1991 | Germany . |
| 2239742 | 7/1991 | United Kingdom . |
| 9210074 | 6/1992 | WIPO . |

Primary Examiner—John K. Peng
Assistant Examiner—Thomas J. Mullen, Jr.

[57] ABSTRACT

A sensing apparatus and method for use in an illumination control monitoring of a particular area. The sensing apparatus includes selectable and independent triggering and retriggering modes for activating and deactivating a lamp. Three sensors, a PIR, a sound and a light sensor cooperatively interact to cause triggering upon detecting motion in a low ambient light room. Thereafter, retriggering results upon either motion or sound being periodically detected in the room. An absence of motion or sound within a predetermined duration results in deactivation of the light and a return to a pretriggering configuration.

5 Claims, 4 Drawing Sheets

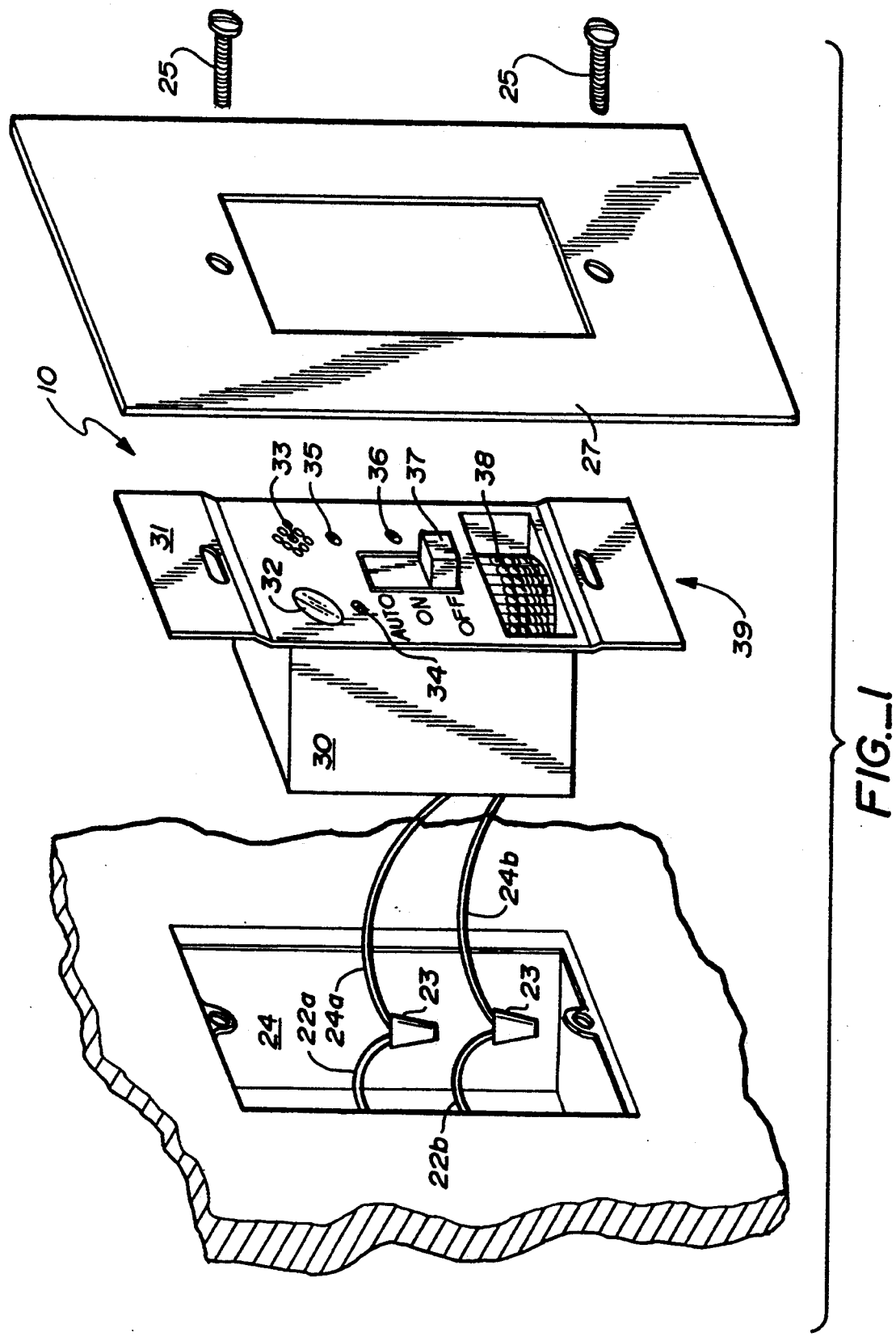

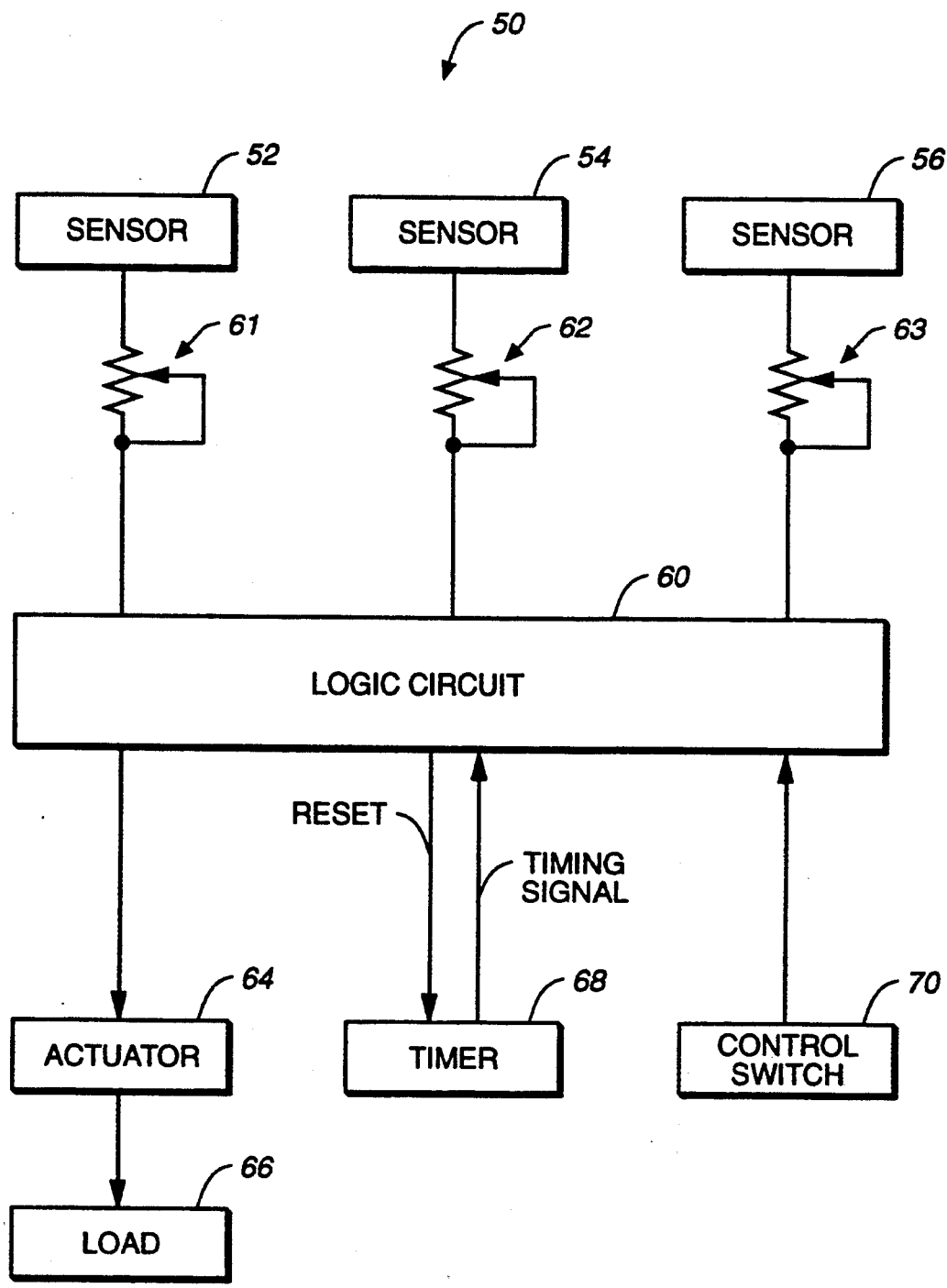
FIG._2

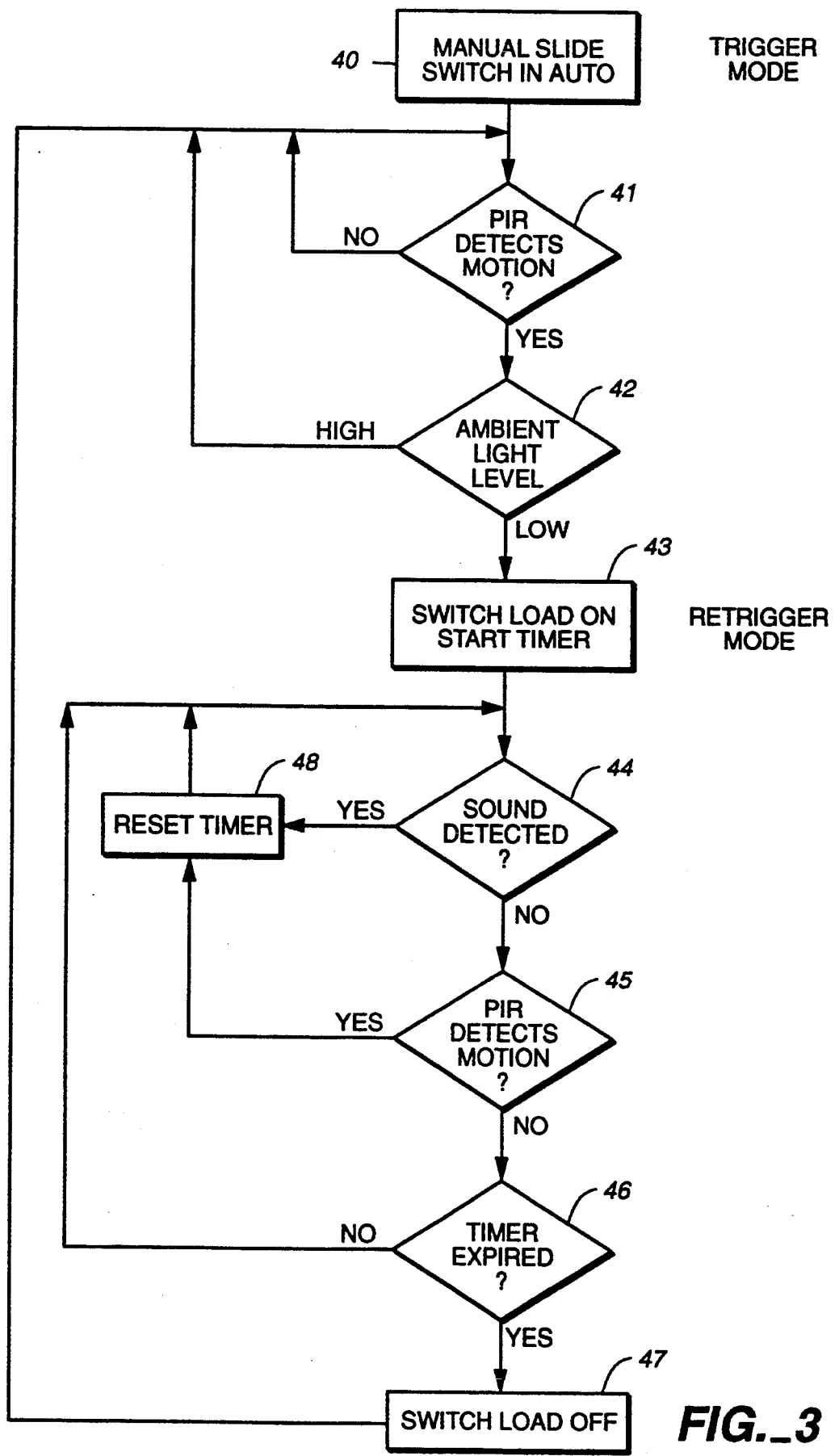
FIG._3

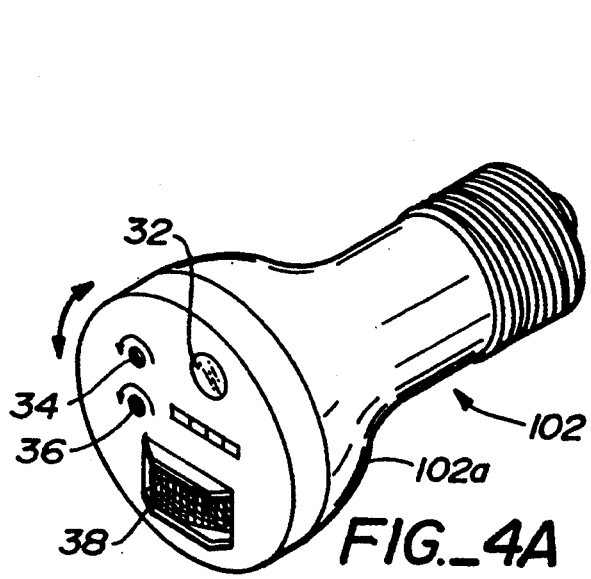
FIG._4A
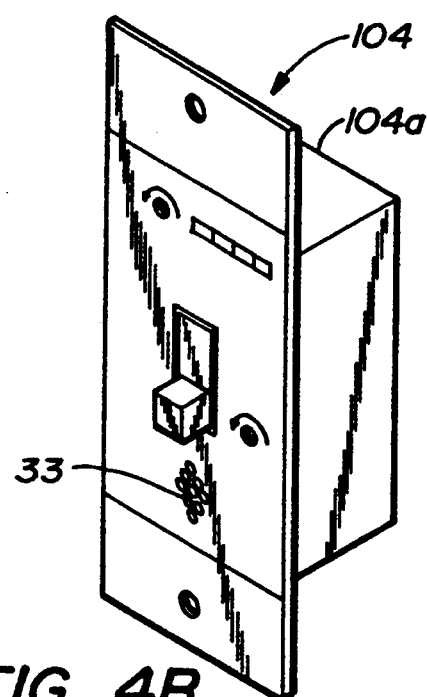
FIG._4B
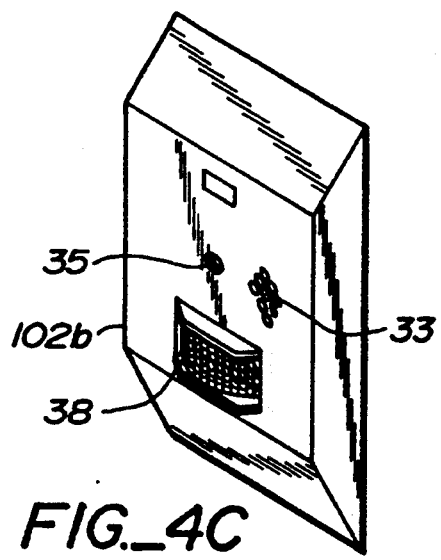
FIG._4C
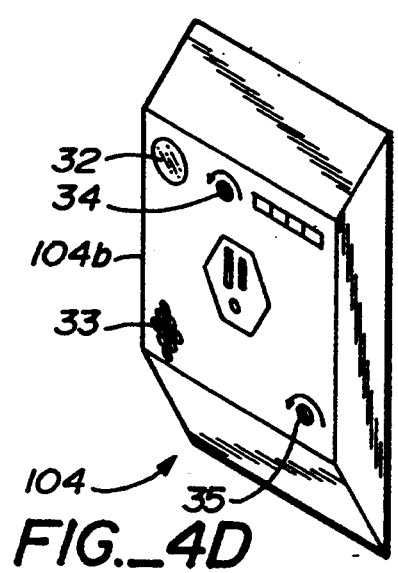
FIG._4D
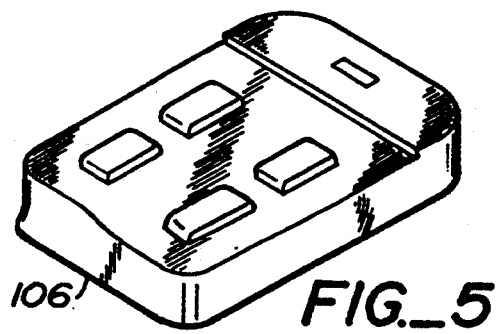
FIG._5

METHOD AND APPARATUS FOR DETECTING ENTRY

This is a continuation of application Ser. No. 07/750,868, filed Aug. 28, 1991, now abandoned.

BACKGROUND OF THE INVENTION

The present invention relates generally to security sensors and to energy-conservative sensors for sensing entry into a monitored area or room. More specifically, the present invention relates to passive sensors for automatically lighting and extinguishing lights when a person enters and leaves a room.

Passive infared (PIR) motion sensing is an expanding technology driven by security and energy conservation demands. One typical use of conventional PIR technology is automatic illumination of room lighting when a person enters a room. A timer will automatically extinguish the lights after a predetermined interval unless the PIR detects the person moving in the room. A disadvantage of these motion-only sensors is that the sensor may not detect a presence of person out of a line-of-sight of the PIR but still within the room. In this case, the sensor extinguishes the lights while the person remains in the room. The consequences of this premature loss of light range from inconvenience and annoyance to potential hazard and bodily injury, depending upon the particular room or area monitored. In some instances, a person may merely have to wave or stand to trigger the sensor while in other instances the person way have to move to a monitored part of the room in darkness.

These prior art room sensors typically employ the same mechanism for triggering and retriggering. That is, the sensor will illuminate room lights (trigger them) when it detects motion and will reset a timer (retrigger the lights) when it detects motion.

SUMMARY OF THE INVENTION

The present invention provides apparatus and method for sensing entry into a room or other monitored area. The present invention provides user-determinable preconditions of selected environmental conditions in the monitored area for triggering and retriggering. The triggering and the retriggering are independent from each other and are able to employ different sensors and monitor different parameters.

In one preferred embodiment, the sensing apparatus includes a motion sensor, an ambient light sensor, and a sound sensor. The preferred embodiment also includes an actuator and a timer, as well as logic circuitry to test for the desired preconditions for triggering and retriggering.

In operation, the preferred embodiment for controlling room illumination monitors for motion in low ambient room light. Upon detecting motion with low light, the logic circuitry triggers the actuator and initiates the timer. To determine when to retrigger, the sensor detects for sound or motion within the room. Without either sound or motion in the room, the timer will expire, extinguishing the lights. After extinguishing the lights, the sensor will wait for its predetermined triggering configuration of the environmental conditions monitored by its sensors.

In another aspect of the invention, the sensitivities of the various sensors are adjustable, providing a large range of applications for the present invention. For instance, adjusting a sound sensitivity for a room permits retriggering simply by conversing with another person, or by turning pages of a book or newspaper. It is possible to adjust either mode of operation, triggering or retriggering, so that only a single sensor will monitor the desired environmental condition.

Additionally, the present invention permits priorities or particular orderings of selected environmental conditions to trigger or retrigger the actuator in response to the sensors, where the priorities or particular orderings of environmental conditions may be selected, independent of each other. One example sets the sensors so that retriggering results from detecting sound only after first detecting motion. For security areas, in some instances it is desirable to trigger an actuator controlling an alarm or light after detecting motion, a flashlight beam and a sound of forced entry, for instance. In some instances, triggering results from first detecting motion, then forced entry, or vice versa. Proper order of the selected signals results in triggering and retriggering, with each independently selectable.

Another embodiment of the present invention employs radio frequency transmissions between the sensors and the actuator, allowing remote switching of desired load. The actuators may operate from power supplies independent from those of the sensors.

The present invention provides users with an ability to tailor entry sensors for particular applications. The improved entry sensor enhances convenience and safety of the user, permitting widespread acceptance of illumination and security controls using the present invention.

Reference to the remaining portions of the specification and drawings may realize a further understanding of the nature and advantages of the present invention.

BRIEF DESCRIPTION OF THE DRAWINGS

FIG. 1 is a view of an overall perspective preferred embodiment of the present invention illustrating a configuration for room illumination control in a switch model mounted within a standard wall box;

FIG. 2 is a block diagram of a circuit employing the present invention;

FIG. 3 is a flow chart illustrating operation of a preferred embodiment of the present invention; and FIGS. 4A-4D show alternate embodiments of the invention illustrating separate use of light, PIR and sound sensors interconnected by a radio frequency (RF) link.

FIG. 4A shows an RF-transmitting motion sensor unit including a PIR sensor and light sensor formed to fit in a socket for a spotlight or track lamp. FIG. 4B shows a battery-operated RF-transmitting motion sensor unit including a sound sensor. FIG. 4C shows an RF-receiving motion sensor unit including a sound sensor mounted together with a conventional electrical wall switch. FIG. 4D shows an RF-receiving motion sensor including sound and light sensors mounted together with a conventional electrical wall outlet.

FIG. 5 shows a hand-held remote control unit for use with the RF units of FIGS. 4A-4D.

DESCRIPTION OF THE PREFERRED EMBODIMENT

FIG. 1 is a view of a preferred embodiment of the present invention illustrating a configuration for room illumination control 10 in a switch model mounted within a standard wall box. The illumination control 10 includes a plastic body 20 and a metal mounting plate 31. Conventional mounting of the mounting plate 31 to a wall box 24 with mounting screws 25 through a cover plate 27. Power from a power source, such as household alternating current connects to one line of the illumination control 10 and a second line connects to another line of the illumination control 10.

A manual slide switch 37 has different positions (OFF, ON, and AUTO) for the different functions of the illumination control 10. In the OFF position, the illumination control 10 is incapable of activating a load regardless of particular environmental conditions in the room. In the ON position, the illumination control 10 activates the load, again without regard for particular environmental conditions. In the AUTO position, the illumination control 10 begins a passive infared (PIR), light and sound detecting process further explained below with reference to FIG. 3.

The illumination control 39 includes a fresnel lens 38 focusing infrared radiation from a monitored area onto a pyroelectric infrared sensor, not shown. The illumination control includes a photoelectric sensor mounted behind transparent cover 32 and a microphone mounted behind holes 33. Sensitivity switches 36, 34 and 35 for each of the three sensors, PIR, photoelectric and microphone respectively adjust a sensitivity of their associated switches. For example, in the preferred embodiment, adjustment sensitivity for switch 35 (audio) permits triggering or retriggering from a range of 10 dB to above 110 dB.

FIG. 2 is a block diagram of a sensing circuit 50 employing a preferred embodiment of the present invention. The sensing circuit 50 includes three environmental sensors 52, 54 and 56 for monitoring various environmental conditions, such as motion, light and sound, for example. A logic circuit 60 monitors output signals from each of the sensors. The logic circuit 60 may be implemented in any number of well-known implementations, including microcontroller circuitry or hardwiring. Each sensor 52, 54, 56 has an associated sensitivity adjustment switch 61, 62, 63 used to set threshold levels. The logic circuit 60, responsive to particular configurations of environmental conditions measured by the sensors and a mode of operation, controls an actuator 64. The actuator 64 controls a load 66. The load 66, for example, may be a light, or an alarm. The logic circuit 60 deactivates the actuator 64 responsive to an assertion of a timing signal from a timer 68. A control switch 70 selects whether the sensing circuit is ON, OFF or in AUTOMATIC detection. When ON, the logic circuit 60 causes the actuator 64 to activate the load 66 irrespective of a condition of the output signals from the sensors 52, 54 and 56. When OFF, the actuator 64 deactivates the load 66. In AUTOMATIC, the logic circuit 60 operates as identified in the description relative to FIG. 3.

FIG. 3 is a flow chart of the operation of the sensing circuit 50 for implementation of an illumination control. Steps 40 through 48 are process steps implemented by the logic circuit 60 of FIG. 2. Sensor 52 is a PIR sensor, sensor 54 is a photoelectric sensor, and sensor 56 is an audio sensor. The load 66 is a lamp. At step 40, the logic circuit 60 determines whether the control switch 70 is in AUTOMATIC or not. If in AUTOMATIC, the logic circuit 60 determines whether the output signal from the PIR sensor falls within a prespecified range indicating motion within a monitored area, at step 41. The range may optionally include upper and lower bounds. If the PIR sensor does not detect motion, the logic circuit 60 cycles back to the step 40, continually testing for motion within the monitored area. If at step 41, the PIR sensor indicates motion, the logic circuit 60 advances to step 42 to test an ambient light level with the photoelectric sensor. For the preferred embodiment, if the ambient light exceeds a predetermined threshold, the monitored area is sufficiently illuminated so the logic circuit 60 will not trigger the lamp, but return to step 41. However, if at step 42 the ambient light is below the threshold, the logic circuit will proceed to step 43. At step 43, the PIR sensor detected motion, followed by the photoelectric sensor determining that the monitored area was sufficiently dark to warrant further illumination. Thus, at step 43, the logic circuit 43 causes the actuator 64 to activate the lamp. Additionally, the logic circuit 60 resets and starts the timer 68. Passing the logic tests at step 41 and step 42 triggers the illumination control. The timer 68 measures a lapse of a predetermined interval. If the illumination control has not been retriggered before expiry of the timer 68, as indicated by assertion of a timer signal to the logic circuit 60, the logic circuit 60 will cause the actuator 64 to turn the lamp off. The retrigger mode cycles through the steps 44 through 48.

In the preferred embodiment, the retriggering begins at step 44 with the audio sensor checking for any sound in the monitored area. Sound falling within an identified range results in the logic circuit 60 resetting the timer 68 at step 48. After resetting, the logic circuit returns to step 44.

If the sound level falls outside the identified range, the logic circuit 60 advances to step 45 to test for motion. An output signal from the PIR sensor within a second (retriggering) range will cause the logic circuit 60 to reset the timer 68 at step 48 and return to step 44. Absent sound or motion within the proper ranges, the logic circuit 60 advances to step 46 to test a status of the timer 68. If the timer 68 has not expired, the logic circuit 60 returns to the step 44. However, finding the timer 68 expired, the logic circuit 60 causes the actuator 64 to deactivate the lamp. Thereafter, the logic circuit 60 returns to step 41, waiting for the particular combination of environmental conditions as measured by the particular combination of sensors.

As the preferred embodiment of the present invention includes multiple sensors monitoring different environmental conditions, it is contemplated that different environmental conditions include two sensors which both detect motion, but in different areas of a monitored area. The term "configuration of environmental conditions" refers to any permutation or combination of the various parameters measured by the particular sensors employed. Ordering is an important part of a preferred embodiment of the present invention.

FIGS. 4A-4D and 5 show alternate preferred embodiments of the present invention illustrating separate use of light, PIR and sound sensors interconnected by a radio frequency (RF) link.

The alternate embodiment include a transmitting sensor 102, a receiving sensor 104 and a handheld remote control 106. The transmitting sensor 102 of this preferred invention includes either a combination motion/light sensor 102a (FIG. 4A) or a combination motion/sound sensor 102b (FIG. 4C). The transmitting sensors 102 operate from either conventional a.c. power (such as by a bulb socket) or battery operated. These transmitting sensors 102 are positioned separate from a cooperating receiving sensor 104. The transmitting sensor 102 provides the sensor signals from its sensors to the receiving sensor 104 via radiofrequency, or equivalent such as infrared signalling.

The cooperating receiving sensor 104, which is a receiving sound sensor 104a (FIG. 4B) for transmitting sensor 102a or a receiving sound/light sensor 104b (FIG. 4D) for transmitting sensor 102b. In this preferred embodiment, the logic circuitry 60 is included within the receiving sensor 104. The system operates similarly to the sensing system described above, except that the radiofrequency intercommunication permits a wider range of environmental conditions for triggering or retriggering events as the sensors are able to be physically separated. To control a system according to the alternate preferred embodiment, the remote control 106 (FIG. 5) can place the system in any of the ON, OFF or AUTOMATIC states.

In conclusion, the present invention provides many advantages over existing devices, including more versatile, convenient and customizable operation. The present invention offers differing triggering and retriggering configurations for various environmental conditions. While the above is a complete description of the preferred embodiments of the invention, various alternatives, modifications, and equivalents may be used. For example, other remote interconnection systems other than radiofrequency can allow communication of the sensor signal. Therefore, the above description should not be taken as limiting the scope of the invention which is defined by the appended claims.

What is claimed is:

1. A sensing apparatus, comprising:
   a first sensor for providing a first signal indicating a status of a first environmental condition;
   a second sensor for providing a second signal indicating a status of a second environmental condition;
   a third sensor for providing a third signal indicating a status of a third environmental condition;
   a timer for asserting a timer signal upon a lapse of a predetermined interval after a reset of said timer by assertion of a reset signal;
   an actuator for activating a load responsive to an assertion of a trigger signal and for deactivating said load responsive to a deassertion of said trigger signal; and
   logic means, coupled to said first sensor, to said second sensor, to said third sensor and to said actuator, for:
      asserting said trigger signal to said actuator to activate said load, and initiating said timer, upon detection of a first predetermined configuration of said first and second environmental conditions as respectively indicated by said first and second sensors when in a trigger mode;
      retriggering said actuator by asserting said reset signal to said timer upon detection of a second predetermined configuration, different from said first predetermined configuration, of said first and third environmental conditions as respectively indicated by said first and third sensors prior to assertion of said timer signal when in a retrigger mode;
      deasserting said trigger signal to said actuator, responsive to an assertion of said timer signal, to deactivate said load; and
      returning to said trigger mode after deactivating said actuator.

2. A sensing method, comprising the steps of:
   monitoring for a first predetermined configuration of a first and second environmental condition respectively indicated by a first sensor and a second sensor;
   activating a load when said first and second sensors indicate said first predetermined configuration exists;
   starting a timer measuring a lapse of a predetermined interval;
   monitoring for a second predetermined configuration, different from said first predetermined configuration, of said first environmental condition and a third environmental condition indicated by a third sensor while said timer measures said predetermined interval;
   resetting said timer if said first and third sensors indicate said second predetermined condition exists prior to lapse of said predetermined interval to retrigger said lapse of said predetermined interval;
   deactivating said load when said timer lapses; and
   returning to a trigger mode to monitor for said first predetermined configuration of said first and second environmental conditions.

3. A sensing method, comprising the steps of:
   triggering a load when a first and a second sensor detect a first predetermined configuration of a first and second respective environmental condition;
   initiating a timer to measure a predetermined interval;
   retriggering said load when said first sensor and a third sensor detect a second predetermined configuration, different from said first predetermined configuration, of said first environmental condition and a third environmental condition prior to a lapse of said predetermined interval;
   resetting said timer after retriggering said load; and
   deactivating said load when said timer measures said predetermined interval.

4. A sensing apparatus, comprising:
   a first sensor for providing a first signal indicating a status of a first environmental condition;
   a second sensor for providing a second signal indicating a status of a second environmental condition;
   a third sensor for providing a third signal indicating a status of a third environmental condition;
   a timer for asserting a timer signal upon a lapse of a predetermined interval after a reset of said timer by assertion of a reset signal;
   an actuator for activating a load responsive to an assertion of a trigger signal and for deactivating said load responsive to a deassertion of said trigger signal; and
   logic means, coupled to said first sensor, to said second sensor, to said third sensor and to said actuator, for:
      asserting said trigger signal to said actuator to activate said load, and initiating said timer, upon detection of a first predetermined permutation of said first and second environmental conditions as respectively indicated by said first and second sensors when in a trigger mode;
      retriggering said actuator by asserting said reset signal to said timer upon detection of a second predetermined permutation, different from said first predetermined permutation, of said first and third environmental conditions as respectively indicated by said first and third sensors prior to assertion of said timer signal when in a retrigger mode;

deasserting said trigger signal to said actuator, responsive to an assertion of said timer signal, to deactivate said load; and returning to said trigger mode after deactivating said actuator.

5. A sensing method, comprising the steps of:

triggering a load when a first and a second sensor detect a first predetermined permutation of a first and second respective environmental condition;

initiating a timer to measure a predetermined interval;

retriggering said load when said first sensor and a third sensor detect a second predetermined permutation, different from said first predetermined permutation, of said first environmental condition and a third environmental condition prior to a lapse of said predetermined interval;

resetting said timer after retriggering said load; and deactivating said load when said timer measures said predetermined interval.

* * * * *